April 7, 1936.  J. M. NORDSTROM  2,036,823
TILTING MECHANISM FOR VENETIAN BLINDS
Filed Aug. 12, 1935
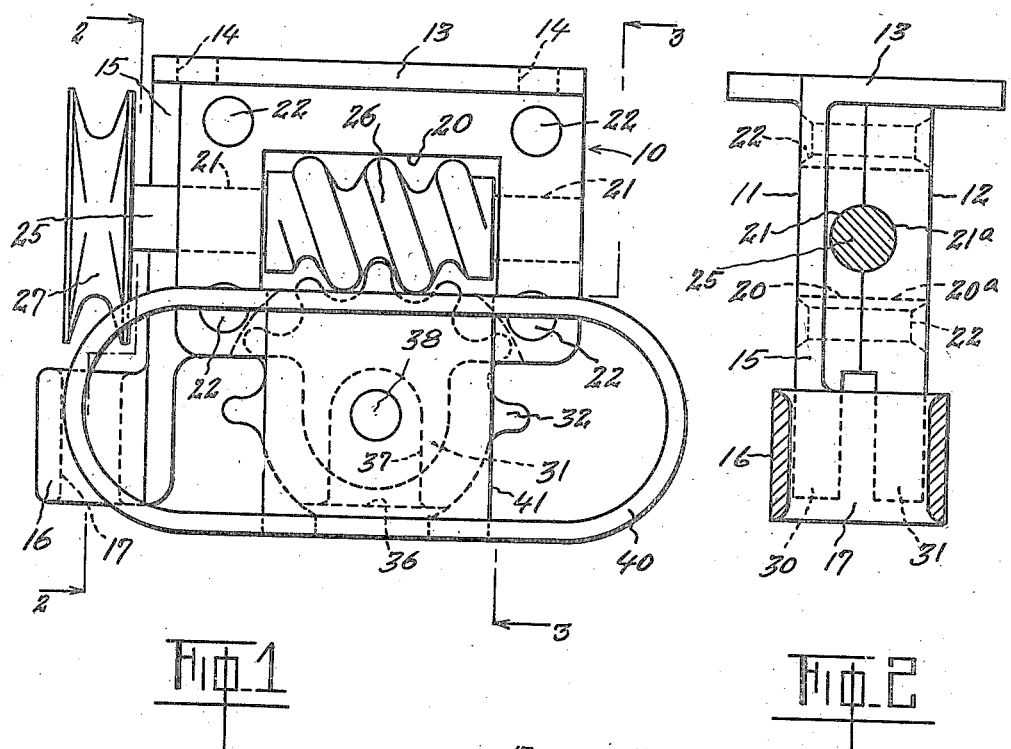
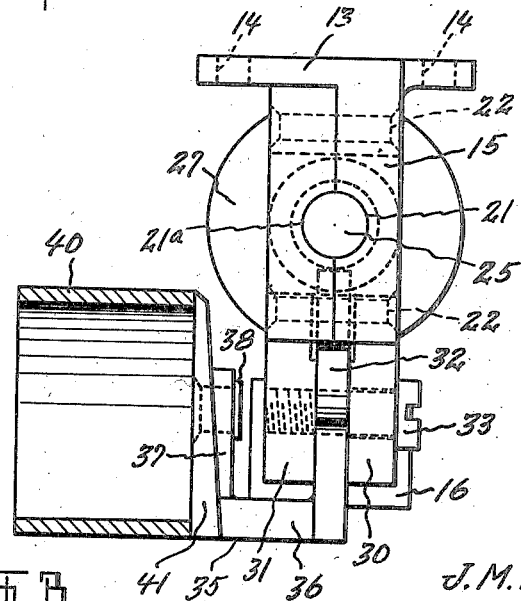
Inventor
J. M. Nordstrom
By Carl Miller
Attorney Patented Apr. 7, 1936

2,036,823

UNITED STATES PATENT OFFICE 2,036,823

TILTING MECHANISM FOR VENETIAN BLINDS

John M. Nordstrom, New York, N. Y.

Application August 12, 1935, Serial No. 35,819

9 Claims. (Cl. 156—17)

The present invention relates to Venetian blinds and more particularly to the mechanism for controlling and adjusting the tilting of the slats forming the blind.

The principal object of the invention is to design a tilting mechanism to be constructed as a unit, which may be readily detachable from the main tilt bar and which is composed of a minimum number of parts that can be readily manufactured and assembled with a minimum of machining and of rugged construction, thus insuring long life and practically no repair.

Another object of the invention is the provision of a simplified worm and worm wheel construction and a mounting therefore which functions also as one of the supporting brackets for the Venetian blind.

A further object of the invention resides in rigidly mounting the support for the main tilt bar directly on the worm wheel proper so as to move in unison therewith.

A still further object of the invention relates to the position of the sheave directly on the worm shaft and exteriorly of the bracket so that in the positioning of the same on a window frame the sheave will be accessible for placement of the operating cord thereon in case of breakage thereof without necessitating the removal of the bracket and the consequent taking down of the Venetian blind.

With these and other objects in view, the present invention resides in the novel and improved features, construction, and combination of parts, hereinafter fully described, and particularly pointed out in the claims, the advantages of which will be readily understood and appreciated by those familiar with and skilled in the art.

Referring to the drawing:

Figure 1 is a side elevational view of the bracket showing the tilting actuating mechanism provided therein.

Figure 2 is one end view thereof partly in section taken on line 2—2, Figure 1.

Figure 3 is the other end view thereof partly in section taken on line 3—3, Figure 1.

The numeral 10 indicates the supporting bracket for one end of the Venetian blind in which is housed the tilting mechanism to be hereinafter described. The bracket 10 is formed of two separate parts 11 and 12; the part 11 comprising a horizontal attaching portion 13 provided with the screw openings 14, and a vertical wall 15 which is provided at one of the lower corners thereof with a transversely arranged guide 16 that is preferably formed integral with said wall 15. Arranged in the guide 16 is an opening 17 through which the operating cord (not shown) is passed.

Formed in the wall 15 of the bracket part 11 is a rectangular opening 20, that portion of the wall on each side of the opening being formed with aligned semi-circular grooves 21 for a purpose to be hereinafter described.

The part 12 of the bracket 10 is formed to mate with the part 11, being provided with a rectangular opening 20a and aligned semi-circular grooves 21a, each of which is identical with those of similar character formed on the part 11, said parts 11 and 12 being adapted to be permanently fastened together by the rivets 22. The registering grooves 21 and 21a in the assembly of the parts 11 and 12 define a circular opening in which is journalled a shaft 25.

The shaft 25 is provided intermediate the ends thereof with a worm 26, the size of which is such as to fit within the openings 20 and 20a without engaging the walls thereof. It is understood, of course, that the shaft 25 and worm 26 are placed in position prior to the riveting together of the parts 11 and 12. One end of the shaft 25 is arranged to extend over the guide 16 and is adapted to have secured thereto a sheave 27 which is of the well known type designed to have frictional engagement with the operating cord (not shown) that is passed thereover. The position of the sheave 27 is such as to be in the same plane with the opening 17 in the guide 16. The other end of the shaft 25 terminates flush with the end wall of the bracket 10 as clearly shown in Figure 1. To prevent the operating cord from slipping off of the sheave, the width of the opening 17 in the guide 16 is made less than the diameter of the sheave.

Each of the bracket parts 11 and 12 is, respectively, provided with a depending extension 30 and 31 centrally arranged intermediate the ends thereof. These extensions 30 and 31 face each other in opposed relation and are of a thickness less than that of said bracket parts so as to be spaced apart in the manner clearly shown in Figures 2 and 3.

Adapted to be inserted between the extensions 30 and 31 is a worm-wheel sector 32 the teeth of which mesh with those of the worm 26 in the manner well known. The worm-wheel sector 32 has pivotal movement on the stud screw 33 which extends through aligned openings formed in the extensions 30—31, and in the worm-wheel 32, the end of said stud preferably having threaded engagement with the opening in the extension 31 as clearly shown in Figure 3. In order to obviate any side-play of the worm-wheel sector 32, the same is preferably made of a thickness to snugly fit between the opposed walls of the extensions 30 and 31.

Projecting outwardly from one side of the worm-wheel sector 32 is a right-angle bracket or arm 35, the horizontal leg 36 of which is preferably integral with said worm-wheel sector. The vertical leg 37 is arranged in spaced parallel relation to the worm-wheel sector and is provided with an opening adapted to receive the rivet 38, the purpose of which is to be hereinafter described.

The main tilt bar (not shown) of the Venetian blind is supported by a sleeve 40 having an inner contour coinciding with an end portion of the main tilt bar so as to permit the insertion of the same into the sleeve. The sleeve 40 is provided at its inner side with a centrally arranged attaching plate 41 that is rigidly secured to the upper and lower walls of said sleeve in any desired manner. The sleeve 40 is permanently secured to the worm-wheel sector 32 by the rivet 38 which securely fastens together the plate 41 and vertical leg 37 of the right-angle bracket 35, as clearly shown in Figure 3.

The plate 41 also serves as a stop for the end of the main tilt bar to limit the inward movement of the same when inserted into said sleeve, in the manner readily apparent.

It is thus seen that movement of the sleeve 40 and that of the main tilt bar is simultaneous with the movement of the worm-wheel sector 32 that is actuated by the turning movements of the worm 26 which is controlled by the operating cord on the sheave 27.

By the arrangement shown this mechanism for operating the tilting of the bars or slats is incorporated with the supporting bracket as a unit handled device that is very simple in construction, substantial and practical.

Having thus set forth and disclosed the nature of this invention, what is claimed is:

1. A blind tilting mechanism comprising a bracket support provided with a central opening, a worm positioned within said opening, shaft means on said worm journaled in said bracket, a worm-wheel sector mounted in said bracket to mesh with said worm, and a sleeve member for receiving an end of a main tilt bar rigidly connected directly to said worm-wheel sector to move in unison therewith.

2. A blind tilting mechanism comprising a bracket provided with a central rectangular opening extending from side to side thereof, a worm positioned within said opening, shaft means on said worm journaled in said bracket, a worm-wheel sector mounted in said bracket to mesh with said worm, and a sleeve member for receiving an end of a main tilt bar rigidly connected directly to said worm-wheel sector to move in unison therewith.

3. In the structure as specified in claim 2, one end of said shaft means extending beyond said bracket, a sheave rigidly mounted on said shaft end for receiving an operating cord, and a guide for said operating cord arranged beneath said sheave in the plane thereof and rigid with said bracket.

4. In the structure as specified in claim 2, said sleeve member being arranged to one side of said worm-wheel sector and in spaced parallel relation thereto, the connection of said sleeve member to said worm-wheel sector being beneath the axis of rotation thereof.

5. In the structure as specified in claim 2, said bracket being T-shaped with the rectangular central opening formed in the vertical leg thereof, the horizontal leg being provided with openings for the reception of fastening devices.

6. In a blind tilting mechanism, a supporting bracket formed of two mating parts each provided with a central rectangular opening and aligned semicircular grooves on each side thereof, a shaft having a worm thereon intermediate the ends thereof positioned for rotational movement in said grooves with the worm arranged in and extending the length of said openings, said mating parts being fastened together, the construction being such that axial movement of the shaft in either direction is prevented.

7. The structure specified in claim 6, each mating part being provided at its lower end with a downwardly directed extension arranged opposite each other in parallel spaced relation, a worm-wheel sector positioned between said extensions to mesh with said worm, and means fixed to said extensions for rotatably supporting said worm-wheel sector.

8. The structure specified in claim 6, one end of said shaft projecting beyond said bracket, a sheave fixedly mounted on said end for receiving an operating cord, and a guide for said cord integral with one of said mating parts and arranged in the plane of said sheave.

9. In a blind tilting mechanism comprising a supporting bracket and a worm and worm-wheel sector drive rotatably mounted therein, an extension on said worm-wheel sector projecting outwardly of said bracket, an arm rigid with said sector extension, and a sleeve adapted to be connected to one end of a main tilt bar rigidly attached to the free end of said arm.

JOHN M. NORDSTROM.